United States Patent [19]

Church et al.

[11] 4,293,886

[45] Oct. 6, 1981

[54] NETWORK PROTECTOR RELAY

[75] Inventors: Larry L. Church, Washington Township, Armstrong County; David R. Smith, McKeesport; Shan C. Sun, Bell Township, Indiana County, all of Pa.

[73] Assignee: Westinghouse Electric Corp., Pittsburgh, Pa.

[21] Appl. No.: 104,647

[22] Filed: Dec. 17, 1979

[51] Int. Cl.³ ............................................. H02H 3/26
[52] U.S. Cl. ...................................... 361/71; 361/62; 361/65; 361/76; 361/82
[58] Field of Search ...................... 361/62, 65, 71, 76, 361/78, 79, 82, 86, 85; 324/86, 87, 83 A, 108; 307/127

[56] References Cited

U.S. PATENT DOCUMENTS

| | | | |
|---|---|---|---|
| 3,248,609 | 4/1966 | Gambale | 361/60 |
| 3,312,864 | 4/1967 | Schwanenflugel | 361/60 |
| 3,405,320 | 10/1968 | Schwanenflugel | 361/82 X |
| 3,697,811 | 10/1972 | Little | 361/82 |
| 3,704,392 | 11/1972 | Chen et al. | 361/60 |
| 3,947,728 | 3/1976 | Smith | 361/76 |
| 4,091,433 | 5/1978 | Wilkinson | 361/76 |
| 4,130,851 | 12/1978 | Perez-Cavero | 361/82 |

Primary Examiner—Patrick R. Salce
Attorney, Agent, or Firm—E. L. Pencoske

[57] ABSTRACT

A network protector relay produces a close signal entirely from sequence components based on the magnitude and phase relationships between the positive sequence component of the phase-to-ground voltages on the network side of the protector and the positive sequence component of the phasing voltages. The close signal may be inhibited by either the presence of the negative sequence component of the phase-to-ground voltages on the network side of the protector or if a trip contact is closed. The trip contact will be closed under certain specified conditions which make it advantageous to prevent manual closing of the contacts.

14 Claims, 5 Drawing Figures

NETWORK PROTECTOR RELAY

BACKGROUND OF THE INVENTION

1. Field of the Invention:

This invention relates to network protective devices used for controlling the connection of a primary feeder bus to a secondary network bus and more particularly to the reclosing circuitry thereof.

2. Description of the Prior Art:

A typical method by which low voltage power is furnished in locations where the load density is high and where continuity of service is to be maintained is by the use of low voltage grid or spot networks. Such networks are supplied with power from more than one set of high voltage primary feeders. Each primary feeder is connected to the network through at least one voltage reducing transformer, a network protector, and a set of fuses. If a primary feeder is lost the power formerly supplied by that feeder is supplied by the remaining feeders.

Network protector relays are designed to control the electrical connection between the network and the primary feeders. When a feeder is electrically connected to the network through a network protector the network protector relay will maintain the connection only if certain well defined conditions are met. For example, if power is flowing from the network into the feeder the feeder is to be disconnected therefrom. If a feeder is electrically disconnected from the network the network protector relay will initiate a signal for closing the network protector, thus connecting the feeder to the network, only if certain well defined conditions are met.

An example of prior art network protector relay designed to provide the above functions is disclosed in U.S. Pat. No. 3,248,609. Disconnection of a feeder from a network is determined by the direction of flow of positive sequence power. Reconnection of the feeder to the network is dependent on the proper relationship between the positive symmetrical component of polyphase voltage appearing on the feeder side of the connection and the positive symmetrical component of voltage appearing on the load side of the connection. Reconnection is also dependent on certain phase relations between the positive symmetrical component of voltage on one side of the connection and the voltage appearing across the connection itself. In a preferred embodiment reconnection of the feeder to the network is restrained by the presence of the negative symmetrical component of voltage on the load side of the connection.

Another example of a prior art network protector relay is disclosed in U.S. Pat. No. 3,947,728 which is assigned to the same assignee as the present invention. The network protector relay disclosed therein will disconnect, or trip, the feeder not only in response to the direction of the flow of positive sequence power outwardly of the network but also in response to unbalanced and simultaneous faults in the feeder network. The network protector relay disclosed therein also includes closing characeristics which will permit the automatic connection of the feeder to the network only when three conditions are met. The conditions are: that the phase sequence of the feeder voltage is the same as the phase sequence of the network voltage, that there is a proper phase relationship between the network and feeder voltages, and that the magnitude of the feeder voltage is such that power will flow into the network.

SUMMARY OF THE INVENTION

The present invention is for a network protector relay producing, entirely from sequence components, a close signal for reconnecting a feeder to a network. Before the network protector will produce a close signal certain predetermined relationships between the magnitude and phase of the positive sequence component of the network voltages and the magnitude and phase of the positive sequence component of the phasing voltages must be satisfied. When the main contacts of the network protector are opened the network protector relay will produce a trip signal that will prevent manual closing of the main contacts if certain other specified conditions are met. If neither the conditions for producing the close signal or the trip signal occur the network protector relay will exhibit a "float" characteristic during which time the network protector will produce neither a trip nor a close signal.

In addition to the above closing characteristics one embodiment of the present invention also includes a novel implementation of known trip characteristics.

DESCRIPTION OF THE PREFERRED EMBODIMENT

Figure 1:
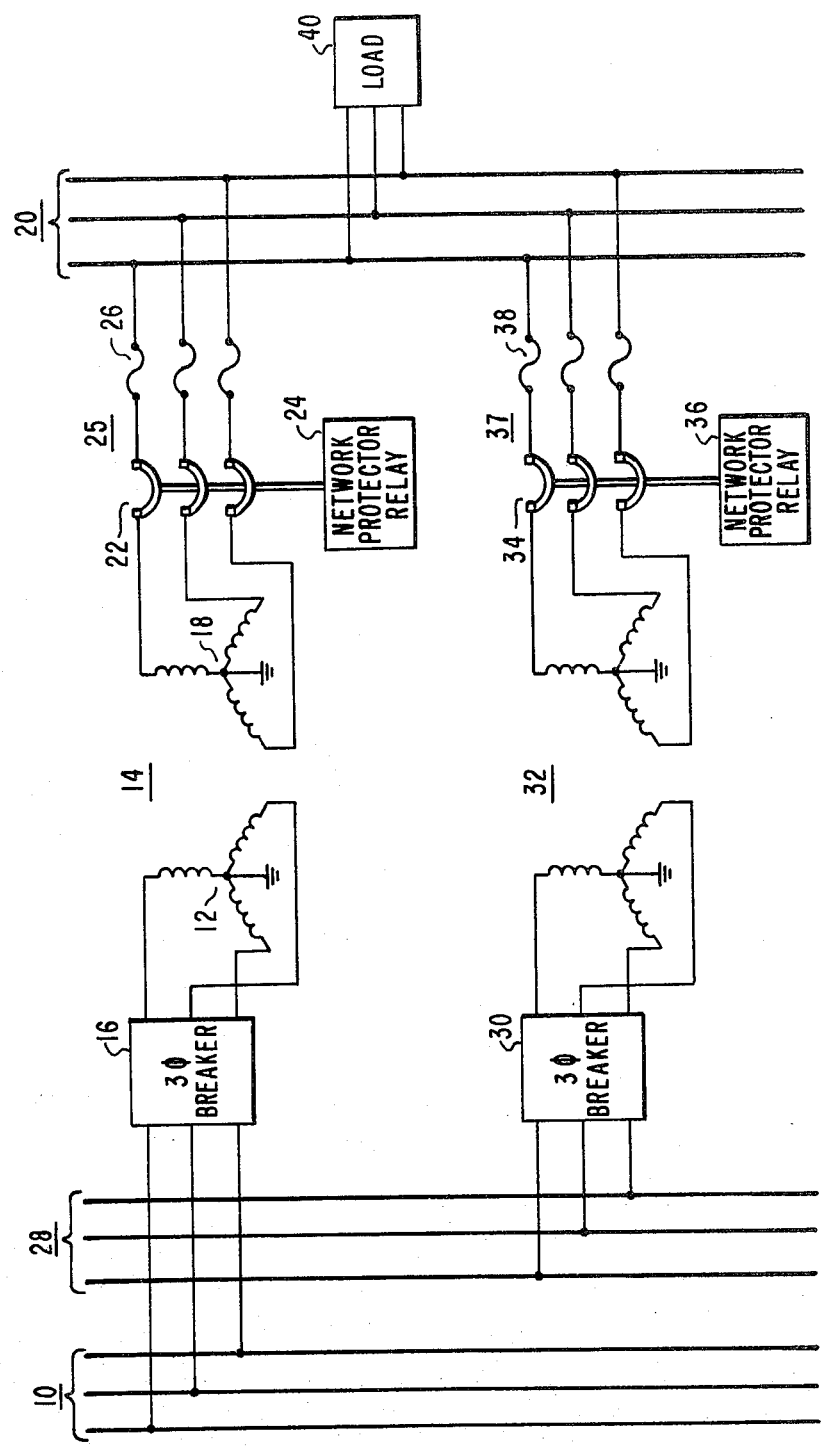
FIG. 1 schematically illustrates a typical feeder bus arrangement for energizing a low voltage network through three phase circuit breakers, transformers, network protectors and fuses.

A typical application for a network protector relay of the type disclosed herein is shown in FIG. 1. In FIG. 1 a first substation feeder 10 is connected to a primary winding 12 of a first step down transformer 14 through a three phase breaker 16. A secondary winding 18 of the transformer 14 is connected to a network bus 20 through a set of main contacts 22 and a first set of fuses 26 of a network protector 25. The operation of the contacts 22 is controlled by a network protector relay 24. Similarly, a second substation feeder 28 is connected to the network bus 20 through a second three phase breaker 30, a second step down transformer 32, a set of main contacts 34 of a second network protector 37 whose operation is controlled by a network protector relay 36, and a second set of fuses 38. The network bus 20 supplies power to a load 40. Since network protectors are often located in relatively inaccessible locations, such as in a vault beneath a street, it is desirable that the sets of contacts 22 and 34 controlled by the network protector relays 24 and 36, respectively, automatically connect and disconnect the substation feeders 10 and 28 to the network bus 20. Details of the network protector relay 24, which is identical to the network protector relay 36, follow hereinafter.

Figure 2:
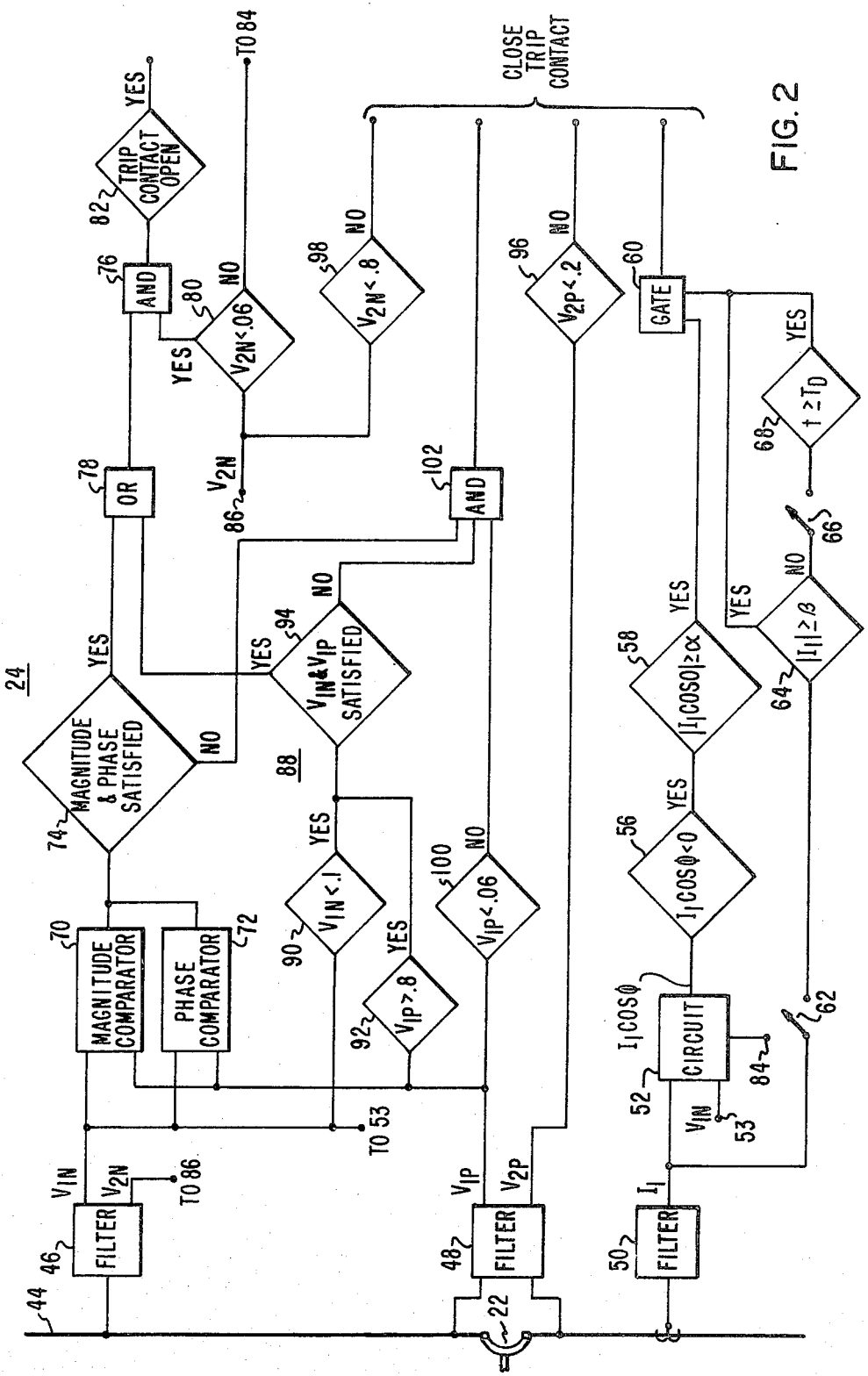
FIG. 2 is a logic block diagram of a network protector relay constructed in accordance with the present invention.

Referring now to FIG. 2, a logic block diagram of the network protector relay 24 is shown. FIG. 2 is not a diagram showing sequential operation. Decision blocks may be satisfied simultaneously, and if a condition is not satisfied, the required signals will remain input thereto until the condition is satisfied. A line 44 represents the conductors of FIG. 1 connecting the secondary winding 18 of the transformer 14 to the network bus 20 through the set of main contacts 22 controlled by the network protector relay 24. A first sequence filter 46 produces an input signal representative of the positive sequence component of the phase to ground voltages on the network side of the protector (hereinafter $V_{1N}$) and produces an input signal representative of the negative sequence component of the phase to ground voltages on the network side of the protector (hereinafter $V_{2N}$). A second sequence filter 48 produces an input signal representative of the positive sequence component of the voltage across the network protector contacts (hereinafter $V_{1P}$) and produces a signal representative of the negative sequence component of the voltage across the network protector contacts (hereinafter $V_{2P}$). The voltage across the contacts 22 of the network protector 24 is called the phasing voltage. A third sequence filter 50 produces an input signal representative of the positive sequence component of the phase currents flowing through the network protector (hereinafter $I_1$).

The signal $I_1$ is input to a circuit 52. The circuit 52 receives at a terminal 53 the signal $V_{1N}$. The circuit 52 produces a signal representative of the multiplication of the $I_1$ signal with the cosine of the phase angle $\phi$ between $I_1$ and $V_{1N}$. The $I_1 \cos \phi$ signal is input to a logic block 56 wherein it is compared to zero. If the signal is less than zero, positive-sequence power is flowing outwardly of the network and a block 58 determines whether the absolute magnitude of the signal is greater than or equal to a first reference value $\alpha$. If the absolute magnitude of the signal is greater than or equal to the reference value $\alpha$ a trip signal is produced. The trip signal is conducted through a gate 60 to a trip contact (not shown). When the trip contact of the network protector relay 24 is closed, the main contacts of the network protector 25 are opened by means not shown. The blocks 52, 56, and 58 produce the basic trip characteristics of the network protector relay 24.

The basic trip characteristics of the relay may be modified by closing a switch 62. When the switch 62 is closed, a logic block 64 will permit the trip signal produced at block 58 to be conducted through the gate 60 only when the absolute magnitude of the signal $I_1$ is greater than or equal to a reference value $\beta$. The basic trip characteristics may be further modified by closing a switch 66. When the switch 66 is closed a logic block 68 will permit the trip signal produced at block 58 to be conducted the gate 60 even though when the absolute magnitude of the signal $I_1$ is less than the reference value $\beta$ if the signal $I_1$ has been less than $\beta$ for a time period greater than or equal to a reference time period $T_D$.

The trip characteristics of the relay will be rotated clockwise by a fixed amount, typically 60°, if the signal $V_{2N}$ is greater than a fixed reference value. The signal $V_{2N}$ is input at a terminal 86 of a block 80 wherein it is compared to a typical value of 0.06 per unit (where one per unit is 125 volts AC line to neutral). If the signal $V_{2N}$ is greater than 0.06 per unit the block 80 produces a trip rotation signal that is input to the multiplier 52 at a terminal 84. The trip rotation signal causes the trip characteristics to be rotated by a fixed amount. The block 80 will be discussed further with respect to the close characteristics of the present invention hereinbelow.

Turning now to the close characteristics of the network protector relay 24, the signal $V_{1N}$ is input to a magnitude comparator 70 and a phase comparator 72. The signal $V_{1P}$ is also input to the magnitude comparator 70 and the phase comparator 72. The output signals of the magnitude comparator 70 and the phase comparator 72 are input to a logic block 74. If the magnitude and phase relationships between the signals $V_{1N}$ and $V_{1P}$ are correct the block 74 will produce a close signal. The close signal is input to an AND gate 76 through an OR gate 78. The AND gate 76 selectively conducts the close signal in response to the logic block 80. The logic block 80 determines if the signal $V_{2N}$ is less than a typical value of 0.06 per unit. If the signal $V_{2N}$ is less than 0.06 per unit, the close signal is conducted to a block 82. At block 82, if the trip contact is open the close signal is conducted to means (not shown) for closing the network protector main contacts 22. If the trip contact is closed, the close signal is not conducted to the means for closing the network protector main contacts. The blocks 70, 72, 74, 80 and 82 produce the normal close characteristics of the network protector relay 24.

When the network fed by the conductors 44 is unenergized or dead, a dead network closing circuit 88 will produce a dead network close signal when certain predetermined conditions are met. Dead network conditions are typically defined as those where the signal $V_{1N}$ is less than 0.1 per unit and the signal $V_{2N}$ is less than 0.06 per unit. If the network is dead and voltages of approximately normal magnitude and correct phase sequence are applied to the transformer side of the network protector 25, the main contacts 22 of the network protector should close to energize the network. When the network is dead, the signal $V_{1N}$ will be either zero, or so small that the decision block 74 cannot be depended upon to give a reliable output to enable dead network closing. Thus, separate logic is needed to detect dead network conditions and provide a dead network closing signal if the proper requirements are met. The dead network closing circuit 88 provides this function. Specifically, the signal $V_{1N}$ is input to a block 90 which determines if the signal is less than a typical value of 0.1 per unit. The signal $V_{1P}$ is input to a block 92 which determines if the signal is greater than a typical value of 0.8 per unit. The output signals of the blocks 90 and 92 are input to a block 94 which determines if the requirements of the blocks 90 and 92 are met. If the requirements are met, the block 94 will produce the dead network close signal which is input to the OR gate 78, selectively conducted by the AND gate 76 in response to the logic block 80, and input to the block 82. The blocks 90, 92 and 94 comprise the dead network closing circuit 88.

When the main contacts 22 of the network protector 25 are open, certain specified conditions may exist which make it desirable to produce a trip signal to inhibit the close signal or the dead network close signal from closing the connection, and to prevent manual closing of the connection. One such condition is imposed by a block 96. The block 96 receives the signal $V_{2P}$ and determines if the signal is less than a typical value of 0.2 per unit. If the signal is not less than 0.2 per unit the block 96 will produce a trip signal for closing the trip contact. If a close signal is produced by either block 74 or block 94 it will be inhibited by block 82 because of the trip signal produced by block 96. A second condition is imposed by block 98. The block 98 receives the sigal $V_{2N}$ and determines if the signal is less than a typical value of 0.8 per unit. If the signal is not less than 0.8 per unit the block 98 produces a trip signal for closing the trip contact thus inhibiting all cloe signals produced and preventing manual closing. Finally, a block 100 receives the signal $V_{1P}$ and determines if the signal is less than a typical value of 0.06 per unit. If the signal is not less than 0.06 per unit a signal is produced which is input to an AND gate 102. The AND gate also receives signals from the blocks 74 and 94 if the conditions imposed therein are not met. The AND gate 102 produces a trip signal for closing the trip contact thus inhibiting all close signals produced and preventing manual closing.

Figure 3:
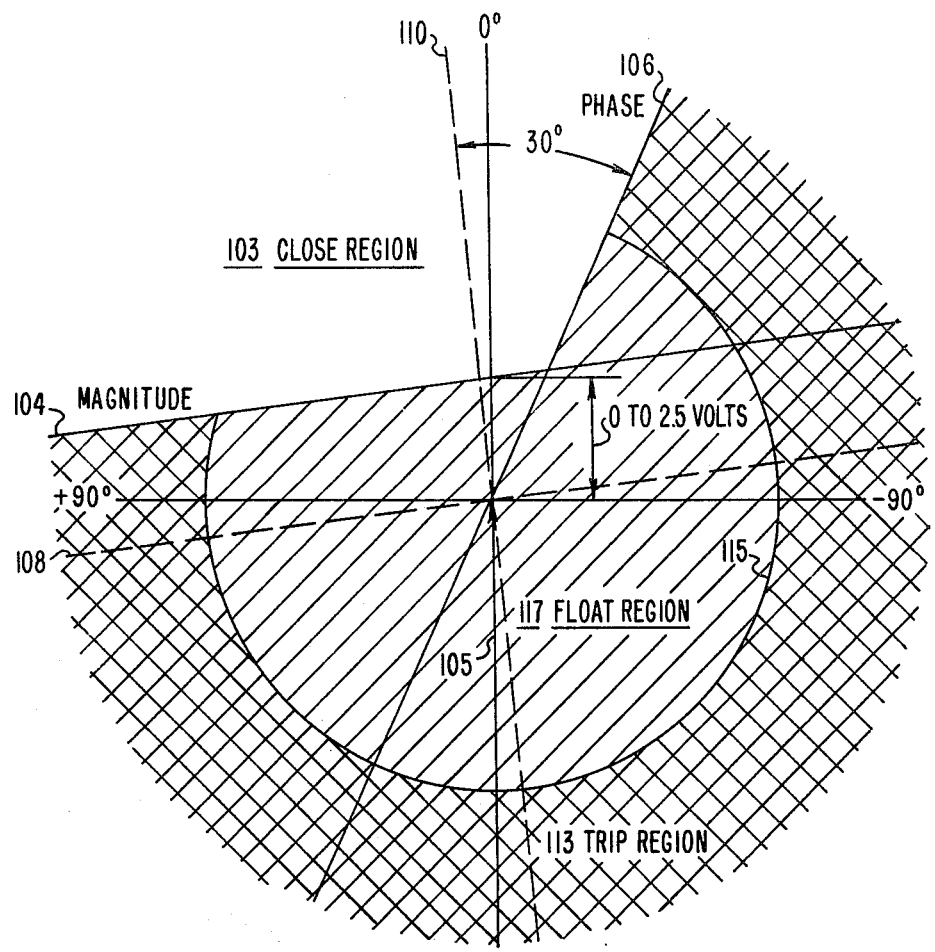
FIG. 3 is a graph illustrating the close characteristics of the present invention.

The normal close characteristics of the network protector relay 24 are more easily understood by referring to FIG. 3. Normal conditions are defined as those where reasonably balanced voltages of normal magnitude and of correct phase sequence are applied to both the network side and the transformer side of the protector such that the signals $V_{2N}$, $V_{2P}$, and the negative sequence component of the phase to ground voltages on the transformer side of the network (hereinafter $V_{2T}$) are essentially zero. Additionally, the signals $V_{1N}$ and the positive sequence component of the phase to ground voltages on the transformer side of the protector (hereinafter $V_{1T}$) are substantially in-phase and nearly equal in magnitude to 1.0 per unit. Under these conditions the network protector relay 24 will call for a close, trip, or will take no action (float) based on the magnitude of the signal $V_{1P}$ and the angular relationship between the signals $V_{1P}$ and $V_{1N}$. FIG. 3 defines the close, trip, and float regions based on where the phasor representing the signal $V_{1P}$ lies.

In FIG. 3 a close region 103 is the unshaded area above a line 104 labeled magnitude and to the left of a line 106 labeled phase. The line 104 is a characteristic produced by the magnitude comparator 70 of FIG. 2. The line 104 represents the required magnitude of the signal $V_{1P}$ with respect to the signal $V_{1N}$, represented by the line 105. The required magnitude of the signal $V_{1P}$ may be varied by the user from a typical value of 2.5 volts in phase with $V_{1N}$ shown by the line 104 to a typical value of 0 volts in phase with $V_{1N}$ shown by a broken line 108. The line 106 is a characteristic produced by the phase comparator 72 of FIG. 2. The line 106 represents the required phase angle of the signal $V_{1P}$ with respect to the phase angle of the signal $V_{1N}$. The required phase angle of the signal $V_{1P}$ may be varied by the user from lagging the signal $V_{1N}$ by a typical value of 25° shown by the line 106 to leading the signal $V_{1N}$ by a typical value of 5° shown by a line 110.

The remaining area in FIG. 3 is divided into a trip region 113 (denoted by crossover hatching) and a float region 117 (denoted by cross hatching) by a partial circle 115. The partial circle 115 is a characteristic produced by the block 100 of FIG. 2. The partial circle 115 represents a requirement that the magnitude of the signal $V_{1P}$ be less than a typical value of 0.06 per unit. If the magnitude of the signal $V_{1P}$ is less than 0.06 per unit, a phasor representing that signal will lie in the float region 117. When a phasor representing the signal $V_{1P}$ lies in the float region the network protector relay 24 produces neither a close signal nor a trip signal. If the magnitude of the signal $V_{1P}$ is greater than 0.06 per unit, a phasor representing that signal will lie in the trip region 113. When a phasor lies in the trip region 113 the network protector relay 24 will produce a trip signal even though the main contacts 22 of the network protector 25 are open to prevent manual closing of the main contacts 22. This concludes the description of the normal close characteristics shown in FIG. 3.

Figure 4A:
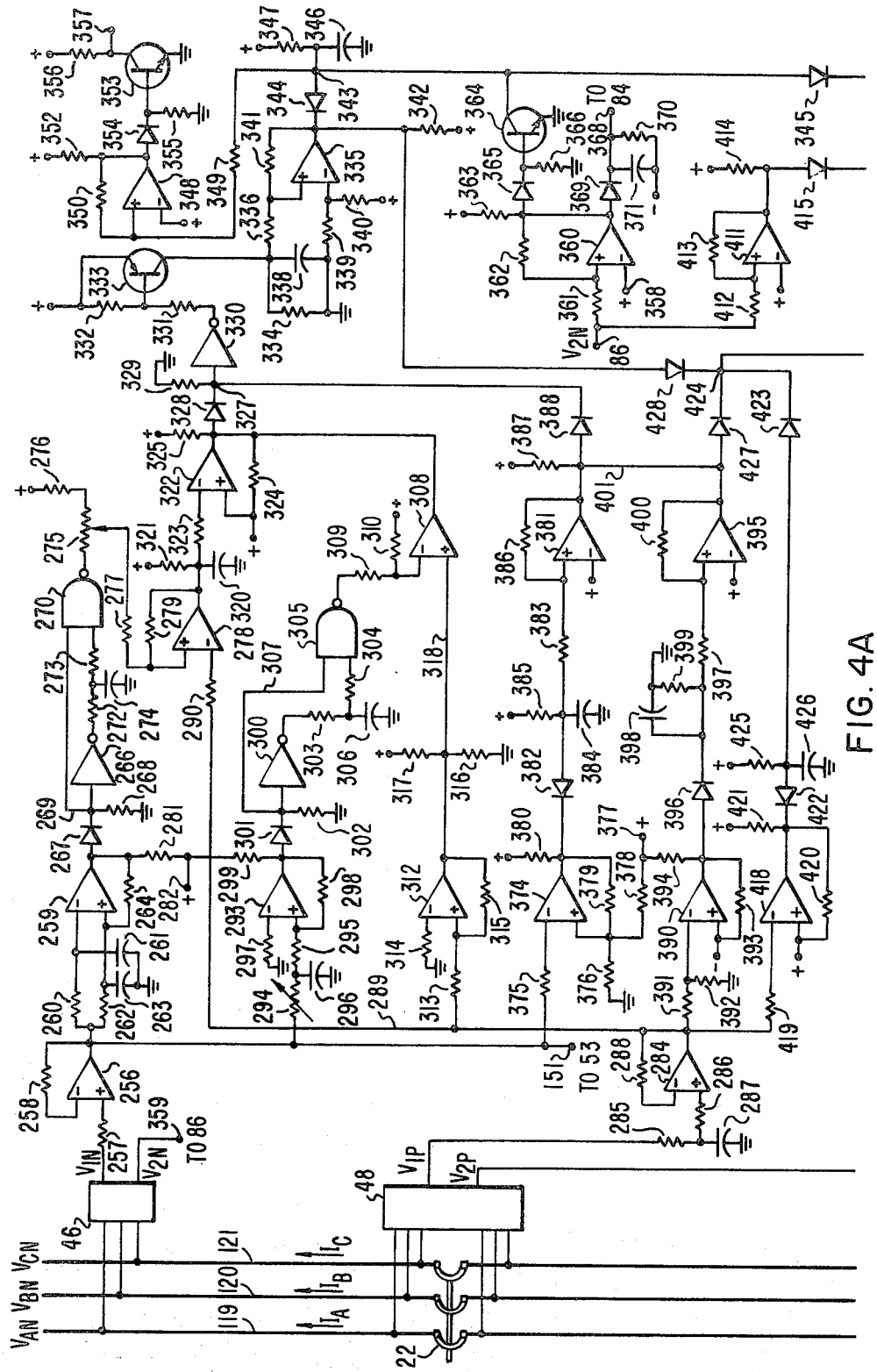
FIGS. 4A and 4B are an electrical schematic of a network protector relay constructed in accordance with the present invention.
Figure 4B:
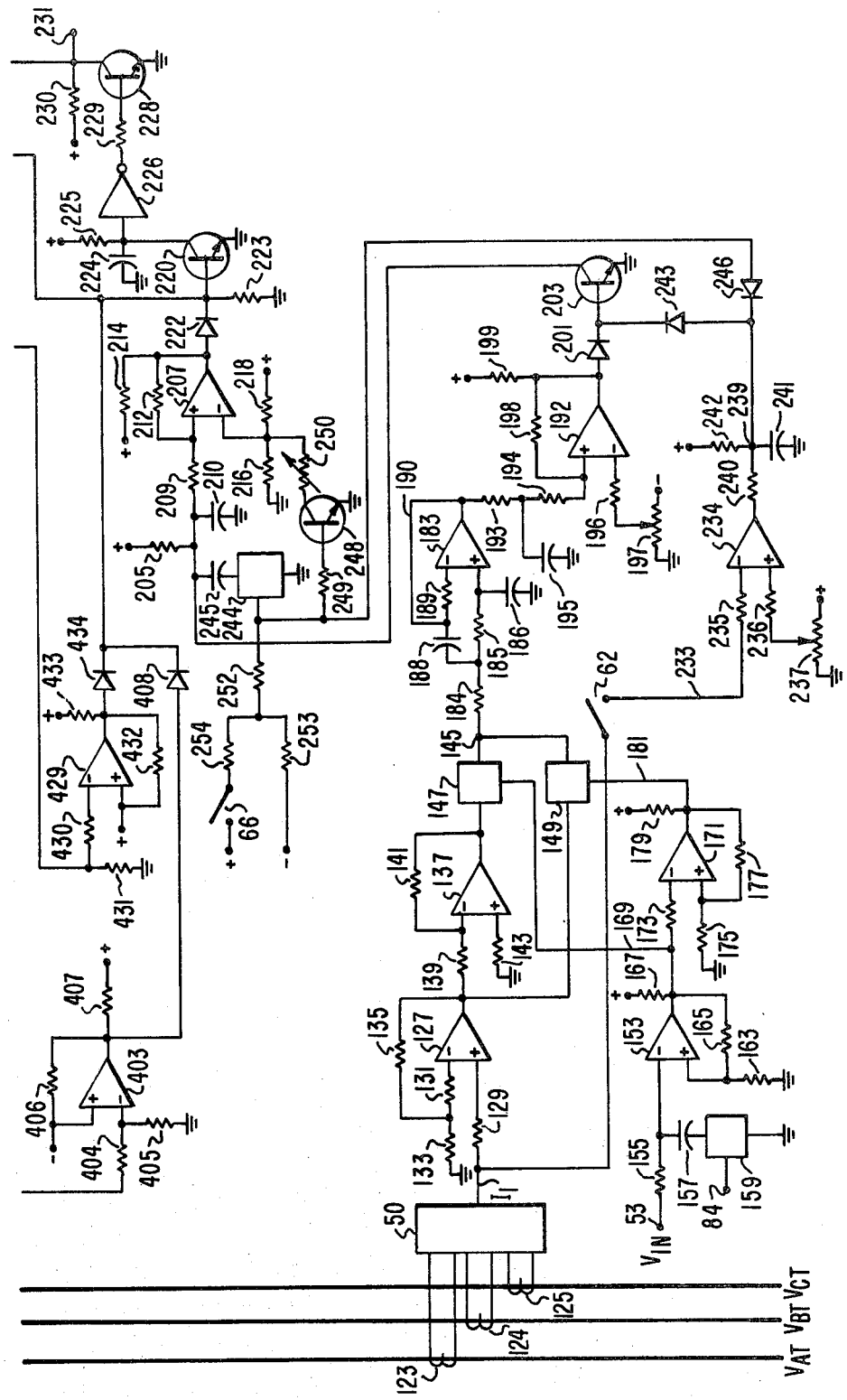

FIGS. 4A and 4B are an electrical schematic illustrating a protector 24 constructed in accordance with the logic block diagram of FIG. 2 and exhibiting the discussed trip and close characteristics. Conductors 119, 120 and 121 carry phase currents $I_A$, $I_B$ and $I_C$, respectively, from the transformer side of the network protector relay 24 through the contacts 22 of the protector 25 to the network side of the protector relay 24. The voltages on the transformer side of the protector are designated $V_{AT}$, $V_{BT}$ and $V_{CT}$; voltages on the network side of the protector are designated $V_{AN}$, $V_{BN}$ and $V_{CN}$. The sequence filter 46 is of a type described in U.S. Pat. No. 4,146,913 which is assigned to the same assignee as the present invention. The sequence filter 46 produces signals representative of the positive $V_{1N}$ and negative $V_{2N}$ sequence components of the phase to ground voltages on the network side of the protector from the input signals $V_{AN}$, $V_{BN}$ and $V_{CN}$. The sequence filter 50 is also described in U.S. Pat. No. 4,146,913. The sequence filter 50 uses input signals derived from current transformers 123, 124, and 125 to produce a signal representative of the positive sequence component $I_1$ of the phase currents. The sequence filter 48 produces signals representative of the positive $V_{1P}$ and negative $V_{2P}$ sequence components of the phasing voltages from input signals which are the voltages across the contacts 22. The voltages across the contacts 22 are the phasing voltages and have a value of zero when the contacts 22 are closed.

The output signal $I_1$ of the filter 50 is input to a non-inverting input terminal of an operational amplifier 127 through a resistor 129. An inverting input terminal of the operational amplifier 127 is connected to ground through the series combination of a resistor 131 and a resistor 133. The junction point of the resistors 131 and 133 is connected to an output terminal of the operational amplifier 127 through a resistor 135. The output terminal of the operational amplifier 127 is connected to an inverting input terminal of an operational amplifier 137 through a resistor 139. The inverting input terminal of the operational amplifier 137 is also connected to an output terminal thereof through a resistor 141. A non-inverting input terminal of the operational amplifier 137 is connected to ground through a resistor 143. The output terminal of the operational amplifier 137 is connected to a node 145 through a first gate 147. The output terminal of the operational amplifier 127 is connected to the node 145 through a second gate 149. The operational amplifier 127 acts as a buffer for the signal $I_1$. The operational amplifier 137 inverts the signal $I_1$. The first gate 147 and the second gate 149 are controlled by signals related to the signal $V_{1N}$, as described hereinafter, such that a signal available at the node 145 is the $I_1$ COS $\phi$ signal representative of the multiplication of the signal $I_1$ and the cosine of the phase angle $\phi$ between the signal $I_1$ and the signal $V_{1N}$.

The signal $V_{1N}$, input at the terminal 53 from a terminal 151, is input to an inverting input terminal of an operational amplifier 153 through a resistor 155. The inverting input terminal is additionally connected to ground through the series combination of a capacitor 157 and a third gate 159. The third gate 159 is responsive to the trip rotation signal input at the terminal 84. A non-inverting input terminal of the operational amplifier 153 is connected to ground through a resistor 163 and is connected to an output terminal thereof through a resistor 165. The output terminal of the operational amplifier 153 is connected to a positive voltage source through a resistor 167, to the gate 147 by a conductor 169, and is also connected to an inverting input terminal of an operational amplifier 171 through a resistor 173. A non-inverting input terminal of the operational amplifier 171 is connected to ground through a resistor 175 and is connected to the output terminal thereof through a resistor 177. The output terminal of the operational amplifier 171 is connected to a positive voltage source through a resistor 179 and is connected to the second gate 149 by a conductor 181.

The operational amplifier 153 produces a square wave responsive to the signal $V_{1N}$. The square wave is used to control the first gate 147 and is inverted by the operational amplifier 171. The inverted square wave is used to control the second gate 149. Whenever the trip rotation signal is input at the terminal 84, the capacitor 157 is connected to ground through the third gate 159 such that the phase angle of the signal $V_{1N}$ Is shifted in response to the value of the capacitor 157. This phase shift has as its result the rotation of the trip characteristics. The operation amplifier 153, the inverters 137 and 171, and the gates 147 and 149 perform the function of the circuit 52 of FIG. 2.

Returning to the node 145, the $I_1$ COS $\phi$ signal is input to a non-inverting input terminal of an operational amplifier 183 through the series combination of resistor 184 and a resistor 185. The non-inverting input terminal is connected to ground through a capacitor 186. The junction point between the resistors 184 and 185 is connected to an inverting input terminal of the operational amplifier 183 through the series combination of a capacitor 188 and a resistor 189. The junction point between the capacitor 188 and the resistor 189 is connected to an output terminal of the operational amplifier 183 by a conductor 190. The operational amplifier 183 acts as a filter.

The filtered $I_1$ COS $\phi$ signal is input to a non-inverting input terminal of an operational amplifier 192 through the series combination of a resistor 193 and a resistor 194. The junction point between the resistor 193 and the resistor 194 is connected to ground through a capacitor 195. The non-inverting input terminal of the operational amplifier 192 is connected to an output terminal thereof through a resistor 198. An inverting input terminal of the operational amplifier 192 is connected to a wiper of a potentiometer 197 through a resistor 196. The potentiometer 197 is connected at one terminal to a negative voltage source and to ground at the other terminal. The output terminal of the operational amplifier 192 is connected to a positive voltage source through a resistor 199. The operational amplifier 192 and associated components perform the functions of blocks 56 and 58 of FIG. 2 by determining if the filtered $I_1$ COS $\phi$ signal is negative and by comparing the magnitude of the signal to the adjustable reference value $\alpha$. The reference value $\alpha$ is adjustable by the user by changing the setting of the potentiometer 197. If the filtered $I_1$ COS $\phi$ signal is negative and has a magnitude greater than the reference value $\alpha$ the operational amplifier 192 will produce the trip signal which is available at the output terminal thereof.

The trip signal is input to a base of a transistor 203 through a diode 201. An emitter of the transistor 203 is connected to ground. A collector of the transistor 203 is connected to a positive voltage source through a resistor 205, is connected to ground through a capacitor 210, and is connected to a non-inverting input terminal of an operational amplifier 207 through a resistor 209. An output terminal of the operational amplifier 207 is connected to a positive voltage source through a resistor 214 and is connected to the non-inverting input terminal thereof through a resistor 212. An inverting input terminal of the operational amplifier 207 is connected to ground through a resistor 216 and is connected to a positive voltage source through a resistor 218. The output terminal of the operational amplifier 207 is further connected to ground through the series combination of a diode 222 and a resistor 223 and is connected to a base of a transistor 220 through the diode 222. An emitter of the transistor 220 is connected to ground. A collector of the transistor 220 is connected to a positive voltage source through a resistor 225, to ground through a capacitor 224, and is connected to an input terminal of an inverter 226. An output terminal of the inverter 226 is connected to a base of a transistor 228 through a resistor 229. An emitter of the transistor 228 is connected to ground. A collector of a transistor 228 is connected to a positive voltage source through a resistor 230 and to an output terminal 231.

The transistor 203 is normally conductive. When the operational amplifier 192 produces the trip signal the transistor 203 becomes non-conductive. The transistor 203 performs the function of the gate 60 of FIG. 2. The operational amplifier 207 acts as a buffer. The transistors 220 and 228 are trip output stages for the trip signal. The trip signal available at the terminal 231 may be used to close a trip contact and provide visual indication of the action taken. This concludes the discussion of the basic trip characteristics.

The trip characteristics may be modified by closing the switch 62. When the switch 62 is closed the signal $I_1$ is carried by a conductor 233 to an inverting input terminal of an operational amplifier 234 through a resistor 235. A non-inverting input terminal of the operational amplifier 234 is connected to a wiper of a potentiometer 237 through a resistor 236. One terminal of the potentiometer 237 is connected to a positive voltage source and the other terminal is connected to ground. An output terminal of the operational amplifier 234 is connected to a node 239 through a resistor 240. The node 239 is connected to ground through a capacitor 241 and is connected to a positive voltage source through a resistor 242. The node 239 is also connected to the base of the transistor 203 through a diode 243. The node 239 is also connected to a control input terminal of a fourth gate 244 through a diode 246. The fourth gate 244 connects the collector of the transistor 203 to ground through a capacitor 245. The control input terminal of the fourth gate 244 is connected to a base of a transistor 248 through a resistor 249. An emitter of the transistor 248 is connected to ground. A collector of the transistor 248 is connected to the inverting input terminal of the operational amplifier 207 through a variable resistor 250. The control input terminal of the fourth gate 244 is further connected to a negative voltage source through the series combination of a resistor 252 and a resistor 253.

The operational amplifier 234 compares the magnitude of the signal $I_1$ to the adjustable reference value $\beta$ thus providing the function of the block 64 of FIG. 2. The reference value $\beta$ may be adjusted by the user by varying the setting of the potentiometer 237. The operational amplifier 234 is capable of maintaining the transistor 203 in a conductive state even though the operational amplifier 192 has produced the trip signal. Thus, when the trip signal is produced by the operational amplifier 192, the condition imposed by the operational amplifier 234 must also be satisfied for the trip signal to be transmitted to the remainder of the circuitry. The fourth gate 244 and the capacitor 245 have no effect on the trip characteristics until the switch 66 is closed. When the switch 66 is closed the junction between the resistors 252 and 253 is connected to a positive voltage source through a resistor 254. Closing the switch 66 effects an additional modification of the trip characteristics. When the switch 66 is closed a positive voltage is input to the control input terminal of the fourth gate 244 such that the gate is conductive and the collector of the transistor 203 is connected to ground through the capacitor 245. The capacitor will eventually charge to an appropriate voltage level to allow any trip signal produced by the operational amplifier 192 to be conducted to the remainder of the circuitry. The time required for the capacitor 245 to charge to an appropriate voltage level is $T_D$. The capacitor 245 provides the function of block 68 of FIG. 2. When the switch 66 is closed the trip signal produced by the operational amplifier 192 will be conducted to the trip output stages even though the condition imposed by the operational amplifier 234 has not been met if the elapsed time is greater than time $T_D$. This concludes the description of the trip characteristics of the protector 24.

Turning now to the close characteristics of the network protector relay 24 the signal $V_{1N}$ produced by the sequence filter 46 is input to a non-inverting input terminal of an operational amplifier 256 through a resistor 257. An inverting input terminal of the operational amplifier 256 is connected to an output terminal thereof through a resistor 258. The signal $V_{1P}$ produced by the sequence filter 48 is input to a non-inverting input terminal of an operational amplifier 284 through the series combination of a resistor 285 and a resistor 286. The junction point of the resistors 285 and 286 is connected to ground through a capacitor 287. An inverting input terminal of the operational amplifier 284 is connected to an output terminal thereof through a resistor 288. The operational amplifiers 256 and 284 act as buffers for the signals $V_{1N}$ and $V_{1P}$, respectively.

The buffered signal $V_{1N}$ produced by the operational amplifier 256 is input to an inverting input terminal of an operational amplifier 259 through a resistor 260 and is input to a non-inverting input terminal of the operational amplifier 259 through a resistor 262. The inverting input terminal of the operational amplifier 259 is connected to ground through a capacitor 261. The non-inverting input terminal of the operational amplifier 259 is connected to ground through a capacitor 263 and is connected to an output terminal thereof through a resistor 264. The output terminal of the operational amplifier 259 is connected to a positive voltage source, input at a terminal 282 through a resistor 281. The output terminal of the operational amplifier 259 is further connected to an input terminal of an inverter 266 through a diode 267. The input terminal of the inverter 266 is connected to ground through a resistor 268 and is connected to an input terminal of a NAND gate 270 by a conductor 269. An output terminal of the inverter 266 is connected to a second input terminal of the NAND gate 270 through the series combination of a resistor 272 and a resistor 273. The junction point between the resistors 272 and 273 is connected to ground through a capacitor 274. An output terminal of the NAND gate 270 is connected to a terminal of a potentiometer 275. The second terminal of the potentiometer 275 is connected to a positive voltage source through a resistor 276. A wiper of the potentiometer 275 is connected to a non-inverting input terminal of an operational amplifier 278 through a resistor 277. The non-inverting input terminal of the operational amplifier 278 is connected to an output terminal thereof through a resistor 279. The buffered signal $V_{1P}$ produced by the operational amplifier 284 is input to an inverting input terminal of the operational amplifier 278 through a conductor 289 and a resistor 290.

The operational amplifiers 259 and 278, the gate 270, and the associated circuitry produce the magnitude comparison function represented by block 70 in FIG. 2. The operational amplifier 259 is a peak detector and the gate 270 acts as a one-shot multivibrator, the combination producing a pulse responsive to the peak value of the signal $V_{1N}$. The pulse is used to provide an adjustable reference value to the operational amplifier 278. The reference value may be adjusted by the user by adjusting the value of the potentiometer 275. The value of the potentiometer 275 determines the position of the line 104 of FIG. 3. The operational amplifier 278 compares the signal $V_{1P}$ to the adjustable reference value and produces a magnitude comparison signal representative of the comparison of the signal $V_{1P}$ to the signal $V_{1N}$.

The buffered signal $V_{1N}$ produced by the operational amplifier 256 is also input to a non-inverting input terminal of an operational amplifier 293 through the series combination of a variable resistor 294 and a resistor 295. The junction point between the variable resistor 294 and the resistor 295 is connected to ground through a capacitor 296. An inverting input terminal of the operational amplifier 293 is connected to ground through a resistor 297. The non-inverting input terminal of the operational amplifier 293 is connected to an output terminal thereof through a resistor 298. The output terminal of the operational amplifier 293 is connected to the positive voltage source input at the terminal 282 through a resistor 299 and is connected to an input terminal of an inverter 300 through a diode 301. The input terminal of the inverter 300 is connected to ground through a resistor 302 and is connected to an input terminal of a NAND gate 305 by a conductor 307. An output terminal of the inverter 300 is connected to a second input terminal of the NAND gate 305 through the series combination of a resistor 303 and a resistor 304. The junction point between the resistors 303 and 304 is connected to ground through a capacitor 306. An output terminal of the NAND gate 305 is connected to an inverting input terminal of an operational amplifier 308 through a resistor 309. The inverting input terminal of the operational amplifier 308 is connected to a positive voltage source through a resistor 310. The buffered signal $V_{1P}$ produced by the operational amplifier 284 is input to a non-inverting input terminal of an operational amplifier 312 through a resistor 313. An inverting input terminal of the operational amplifier 312 is connected to ground through a resistor 314. The non-inverting input terminal of the operational amplifier 312 is connected to an output terminal thereof through a resistor 315. The output terminal of the operational amplifier 312 is connected to ground through a resistor 316, to a positive voltage source through a resistor 317, and is connected to a non-inverting input terminal of the operational amplifier 308 by a conductor 318.

The operational amplifiers 293, 308, and 312, together with the gate 305 provide the phase comparison function represented by the block 72 of FIG. 2. The variable resistor 294, the resistor 295, and the capacitor 296 permit the user to adjust the phase angle of the signal $V_{1N}$ input to the operational amplifier 293. The adjustment of the value of the variable resistor 294 provides the phase characteristic represented by line 106 of FIG. 3. The operational amplifier 293 acts as a buffer. The NAND gate 305 and associated circuitry acts as a one-shot multivibrator producing a pulse representative of the zero crossing of the phase shifted signal $V_{1N}$. The operational amplifier 312 produces a square wave representative of the signal $V_{1P}$. The operational amplifier 308 compares the pulse representative of the zero crossing of the phase shifted signal $V_{1N}$ to the square wave representative of the signal $V_{1P}$. The operational amplifier 308 produces a phase comparison signal representative of the comparison.

The magnitude comparison signal produced by the operational amplifier 278 is input to an inverting input terminal of an operational amplifier 322 through a resistor 323. The output terminal of the operational amplifier 278 is connected to ground through a capacitor 320 and is connected to a positive voltage source through a resistor 321. The phase comparison signal produced by the operational amplifier 308 is input to a non-inverting input terminal of the operational amplifier 322 through a resistor 324. The non-inverting input terminal of the operational amplifier 322 is connected to a positive voltage source and is connected to an output terminal thereof through the resistor 324. The output terminal of the operational amplifier 322 is connected to a positive voltage source through a resistor 325. The operational amplifier 322 determines if the magnitude and phase relationships between the signals $V_{1N}$ and $V_{1P}$ are satisfied as represented by the decision block 74 of FIG. 2. The operational amplifier 322 produces the close signal at the output terminal thereof.

The close signal is conducted to a node 327 through a diode 328. The node 327 is connected to ground through a resistor 329 and is connected to an input terminal of an inverter 330. An output terminal of the inverter 330 is connected to a positive voltage source through the series connection of a resistor 331 and a resistor 332. The junction between the resistor 331 and the resistor 332 is connected to a base of a transistor 333. A collector of the transistor 333 is connected to the positive voltage source. An emitter of the transistor 333 is connected to ground through the parallel combination of a resistor 334 and a capacitor 338. The emitter of the transistor 333 is also connected to a non-inverting input terminal of an operational amplifier 335 through a resistor 336. An inverting input terminal of the operational amplifier 335 is connected to ground through a resistor 339 and is connected to a positive voltage source through a resistor 340. The non-inverting input terminal of the operational amplifier 335 is connected to an output terminal thereof through a resistor 341. The output terminal of the operational amplifier 335 is connected to a positive voltage source through a resistor 342 and is connected to a node 343 through a diode 344. The node 343 is connected to the collector of the transistor 228 through a diode 345, to ground through a capacitor 346, to a positive voltage source through a resistor 347 and to a non-inverting input terminal of an operational amplifier 348 through a resistor 349. An inverting input terminal of the operational amplifier 348 is connected to a positive voltage source. The non-inverting input terminal of the operational amplifier 348 is connected to an output terminal thereof through a resistor 350. The output terminal of the operational amplifier 348 is connected to a positive voltage source through a resistor 352 and to a base of a transistor 353 through a diode 354. The base of the transistor 353 is connected to ground through a resistor 355. An emitter of the transistor 353 is connected to ground. An collector of the transistor 353 is connected to a positive voltage source through a resistor 356 and is connected to an output terminal 357.

The signal $V_{2N}$ produced by the sequence filter 46 and available at an output terminal 359 is input, at the terminal 86, to a non-inverting input terminal of an operational amplifier 360 through a resistor 361. An inverting input terminal of the operational amplifier 360 is connected to a positive voltage source input at a terminal 358. The non-inverting input terminal of the operational amplifier 360 is connected to an output terminal thereof through a resistor 362. The output terminal of the operational amplifier 360 is connected to a positive voltage source through a resistor 363, to a base of a transistor 364 through a diode 365, and to a terminal 368 through a diode 369. The base of the transistor 364 is connected to ground through a resistor 366. An emitter of the transistor 364 is connected to ground. A collector of the transistor 364 is connected to the node 343. The terminal 368 is connected to a negative voltage source through the parallel combination of a resistor 370 and a capacitor 371. The signal available at the terminal 368 is the trip rotation signal and is input to the control input terminal 84 of the third gate 159.

The operational amplifier 360 compares the signal $V_{2N}$ to a positive reference value determined by the positive voltage input at the terminal 358. The operational amplifier 360 together with the transistor 364 provide the function represented by the decision block 80 of FIG. 2. The node 343 acts as the AND gate 76, of FIG. 2, selectively conducting the close signal in response to the operational amplifier 360. Thus, the condition imposed by the operational amplifier 360 must be satisfied for the close signal to be conducted to the close output stages 348 and 353. The connecton of the node 343 to the collector of the transistor 228 through the diode 345 provides the function of the block 82 of FIG. 2. If the trip contact is closed, the close signal will be inhibited from closing the main contacts 22. If the close signal is not inhibited it will be available at the terminal 357 to initiate closing the main contacts 22.

Turning now to the dead network closing circuit 88, the buffered signal $V_{1N}$ produced by the operational amplifier 256 is also input to an inverting input terminal of an operational amplifier 374 through a resistor 375. A non-inverting input terminal of the operational amplifier 374 is connected to ground through a resistor 376, to a positive voltage source input at a terminal 377 through a resistor 378, and to an output terminal of the operational amplifier 374 through a resistor 379. The output terminal of the operational amplifier 374 is connected to a positive voltage source through a resistor 380 and to a non-inverting input terminal of an operational amplifier 381 through the series combination of a diode 382 and a resistor 383. The junction between the diode 382 and the resistor 383 is connected to ground through a capacitor 384 and is connected to a positive voltage source through a resistor 385. An inverting input terminal of the operational amplifier 381 is connected to a positive voltage source. The non-inverting input terminal of the operational amplifier 381 is connected to an output terminal thereof through a resistor 386. The output terminal of the operational amplifier 381 is connected to a positive voltage source through a resistor 387 and to the node 327 through a diode 388.

The buffered signal $V_{1P}$ produced by the operational amplifier 284 is also input to an inverting input terminal of an operational amplifier 390 through a resistor 391. The inverting input terminal of the operational amplifier 390 is connected to ground through a resistor 392. A non-inverting input terminal of the operational amplifier 390 is connected to a negative voltage source and is connected to an output terminal thereof through a resistor 393. The output terminal of the operational amplifier 390 is connected to the positive voltage source input at the terminal 377 through a resistor 394 and is input to a non-inverting input terminal of an operational amplifier 395 through the series combination of a diode 396 and a resistor 397. The junction between the diode 396 and the resistor 397 is connected to ground by the parallel combination of a capacitor 398 and a resistor 399. An inverting input terminal of the operational amplifier 395 is connected to a positive voltage source. The non-inverting input terminal of the operational amplifier 395 is connected to an output terminal thereof through a resistor 400. The output terminal of the operational amplifier 395 is connected to the output terminal of the operational amplifier 381 by a conductor 401.

The operational amplifiers 374, 381, 390, and 395 make up the dead network closing circuit 88. The operational amplifier 374 compares the signal $V_{1N}$ to a reference value, thus providing the function represented by the decision block 90 of FIG. 2. The operational amplifier 390 compares the signal $V_{1P}$ to a negative reference value, thus providing the function represented by the block 92 of FIG. 2. The operational amplifiers 381 and 395 provide the function represented by the decision block 94 of FIG. 2. The node 327 acts as an OR gate and provides the function represented by the OR gate 78 of FIG. 2. The signal input to the node 327 through the diode 388 is the dead network close signal. This concludes the description of the normal close characteristics and the dead network close characteristics of the network protector 24.

The signal $V_{2P}$ produced by the sequence filter 48 is input to an inverting input terminal of an operational amplifier 403 through a resistor 404. The inverting input terminal of the operational amplifier 403 is connected to ground through a resistor 405. A non-inverting input terminal of the operational amplifier 403 is connected to a negative voltage source and is connected to an output terminal thereof through a resistor 406. The output terminal of the operational amplifier 403 is connected to a positive voltage source through a resistor 407 and is connected to the base of the transistor 220 through a diode 408. The operational amplifier 403 compares the signal $V_{2P}$ to a negative reference value and thus provides the function represented by the block 96 of FIG. 2. The operational amplifier 403 produces a trip signal which is input through the diode 408 to the trip output stages. The trip signal produced by the operational amplifier 403 is produced when the main contacts 22 of the network protector 25 are open. Therefore, the trip signal is used to both inhibit any close signal which may be produced and to prevent manual closing.

The signal $V_{2N}$ input at the terminal 86 is input to a non-inverting input terminal of an operational amplifier 411 through a resistor 412. An inverting input terminal of the operational amplifier 411 is connected to a positive voltage source. The non-inverting input terminal of the operational amplifier 411 is connected to an output terminal thereof through a resistor 413. The output terminal of the operational amplifier 411 is connected to a positive voltage source through a resistor 414 and is connected to the base of the transistor 220 through a diode 415. The operational amplifier 411 produces a trip signal which is input through the diode 415 to the trip output stages, thus providing the function of block 98 of FIG. 2. The trip signal produced by the operational amplifier 411 is produced when the main contacts 22 of the network protector 25 are open. Therefore, the trip signal produced by the operational amplifier 411 is used to inhibit any close signal which may be produced and to prevent manual closing.

The buffered signal $V_{1P}$ produced by the operational amplifier 284 is input to an inverting input terminal of an operational amplifier 418 through a resistor 419. A non-inverting input terminal of the operational amplifier 418 is connected to a positive voltage source and is connected to an output terminal thereof through a resistor 420. The output terminal of the operational amplifier 418 is connected to a positive voltage source through a resistor 421 and is connected to a node 424 through the series combination of a diode 422 and a diode 423. The junction point between the diode 422 and the diode 423 is connected to a positive voltage source through a resistor 425 and is connected to ground through a capacitor 426. The node 424 is connected to the output terminal of the operational amplifier 395 through a diode 427 and is connected to the output terminal of the operational amplifier 335 through a diode 428. The node 424 is further connected to ground through a resistor 431 and to an inverting input terminal of an operational amplifier 429 through a resistor 430. A non-inverting input terminal of the operational amplifier 429 is connected to a positive voltage source and is connected to an output terminal thereof through a resistor 432. The output terminal of the operational amplifier 429 is connected to a positive voltage source through a resistor 433 and is connected to the base of the transistor 220 through a diode 434.

The operational amplifier 418 compares the signal $V_{1P}$ to a positive voltage source and thus provides the function presented by the decision block 100 of FIG. 2. The node 424 receives signals from the operational amplifiers 418, 395 and 335. The node 424 acts as an AND gate and provides the function of the AND gate 102 of FIG. 2. The node 424 together with the operational amplifier 429 produces a trip signal which is input through the diode 434 to the trip output stages. The trip signal is produced when the main contacts 22 of the network protector 25 are open. Therefore, the trip signal is used to inhibit any close signal which may be produced and to prevent manual closing. This concludes the discussion of the circuit shown in FIG. 4.

Briefly reviewing, the present invention is for a network protector producing a close signal entirely from sequence components. Based on a comparison of the magnitudes and phase angles of the signals $V_{1N}$ and $V_{1P}$ a close signal will be produced. The close signal may be inhibited from closing the network protector's contacts by the presence of the signal $V_{2N}$ or if the trip contact is closed. The present invention also includes circuitry for producing a close signal under dead network conditions. Finally, the present invention will exhibit a "float" characteristic during which time the network protector relay 24 will produce neither a trip nor a close signal.

Finally, the embodiment discussed herein and the specific reference values referred to are intended for illustration and not limitation. It is anticipated that various modifications of the circuit may be made which will fall within the scope of the claimed invention.

What is claimed is:

1. A network protector relay producing, entirely from sequence components, signals for opening and closing a connection between a polyphase feeder bus and a polyphase network bus, comprising:

input means producing signals representative of the positive and negative sequence components of the phase-to-ground voltages on the network side of said protector relay, the positive sequence component of the phasing voltages, and the positive sequence component of the phase currents;

first circuit means producing an $I_1 \cos \phi$ signal representative of the multiplication of said positive sequence component of said phase currents and the cosine of the phase angle between said positive sequence component of said phase currents and said positive sequence component of the phase-to-ground voltages;

means providing a first reference signal;

means comparing said $I_1 \cos \phi$ signal and said first reference signal, providing a trip signal opening said connection in response to a predetermined relationship therebetween;

second circuit means comparing the magnitude and the phase angle of said positive sequence component of said phase-to-ground voltages to the magnitude and the phase angle of said positive sequence component of said phasing voltages, providing a close signal closing said connection in response to a predetermined relationship therebetween;

means providing a second reference signal; and third circuit means comparing said negative sequence component of said phase-to-ground voltages and said second reference signal, said means inhibiting said close signal from closing said connection in response to a predetermined relationship therbetween.

2. The network protector relay of claim 1 wherein the first circuit means includes an operation amplifier receiving at an input terminal thereof the positive sequence component of the phase-to-ground voltages and produces a square wave responsive thereto, and includes a first inverter receiving said square wave, and includes the series combination of a second inverter and a first transmission gate, and includes a second transmission gate in parallel with said series combination, and wherein said second inverter receives the positive sequence component of the phase currents, and wherein said first transmission gate selectively conducts the inverted positive sequence component of the phase currents in response to said square wave, and wherein said second transmission gate selectively conducts the positive sequence component of the phase currents in response to the inverted square wave such that the output signal of the parallel combination is the $I_1 \cos \phi$ signal.

3. The network protector relay of claim 2 including a first comparator comparing the negative sequence component of the phase-to-ground voltages to a predetermined reference value, and wherein the input terminal of the operational amplifier is connected to ground by the series combination of a capacitor and a third transmission gate, said third transmission gate selectively conducting to ground the positive sequence component of the phase-to-ground voltages in response to said first comparator such that the phase angle of the positive sequence component of the phase-to-ground voltages input to said operational amplifier is shifted.

4. The network protector relay of claim 3 including a second comparator comparing the magnitude of the positive sequence component of the phase currents to an adjustable reference value, and including a gating means selectively conducting the trip signal in response to said second comparator.

5. The network protector relay of claim 4 including the series combination of a capacitor and a fourth transmission gate, said fourth transmission gate selectively conducting the trip signal to ground in response to the second comparator.

6. The network protector relay of claim 1 wherein the second circuit means includes first circuit elements receiving the positive sequence component of the phase-to-ground voltages and producing a pulse responsive to the peak of said positive sequence component of the phase-to-ground voltages, and includes a first comparator comparing said pulse to the positive sequence component of the phasing voltages providing a magnitude comparison signal in response to a predetermined relationship therebetween.

7. The network protector relay of claim 6 wherein the first circuit elements include a peak detector receiving the positive sequence component of the phase-to-ground voltages, and includes a one-shot producing the pulse in response to said peak detector.

8. The network protector relay of claim 7 wherein the second circuit means further includes second circuit elements receiving the positive sequence component of the phase-to-ground voltages and producing a pulse responsive to the zero crossing of said positive sequence component of the phase-to-ground voltages, and includes an operational amplifier receiving the positive sequence component of the phasing voltages and producing a square wave responsive thereto, and includes a second comparator comparing said pulse to said square wave providing a phase comparison signal in response to a predetermined relationship therebetween, and includes a third comparator comparing the magnitude comparison signal to said phase comparison signal providing the close signal in response to a predetermined relationship therebetween.

9. The network protector relay of claim 8 wherein the second circuit elements includes an adjustable phase shifter receiving the positive sequence component of the phase-to-ground voltages, and includes a one-shot producing the pulse in response to said phase shifter.

10. The network protector relay of claim 1 including circuit elements comparing the positive sequence component of the phase-to-ground voltages to a first fixed reference value and comparing the positive sequence component of the phasing voltages to a second fixed reference value and producing a dead network close signal representative of both of said comparisons, and including an OR gate responsive to both said dead network close signal and the close signal.

11. The network protector relay of claim 10 wherein the third circuit means includes a comparator comparing the negative sequence component of the phase-to-ground voltages to the reference signal and providing a signal inhibiting the closing of the connection in response to a predetermined relationship therebetween.

12. The network protector relay of claim 11 wherein the third circuit means includes a comparator comparing the positive sequence component of the phasing voltages to a reference value, and includes an AND gate responsive to said comparison and to the close signal and to the dead network close signal, said AND gate producing a signal inhibiting the closing of the connection.

13. The network protector relay of claim 1 wherein the third circuit means includes a comparator comparing the negative sequence component of the phase-to-ground voltages to the reference signal and providing a signal inhibiting the closing of the connection in response to a predetermined relationship therebetween.

14. The network protector relay of claim 1 including input means producing the negative sequence component of the phasing voltages, and wherein the third circuit means includes a comparator comparing said negative sequence component of the phasing voltages to a fixed reference value and providing a signal inhibiting the closing of the connection in response to a predetermined relationship therebetween.

* * * * *